Feb. 25, 1964     I. M. ABRAMS     3,122,514
ION EXCHANGE RESINS AND METHOD OF PREPARATION THEREOF
Filed Sept. 26, 1958
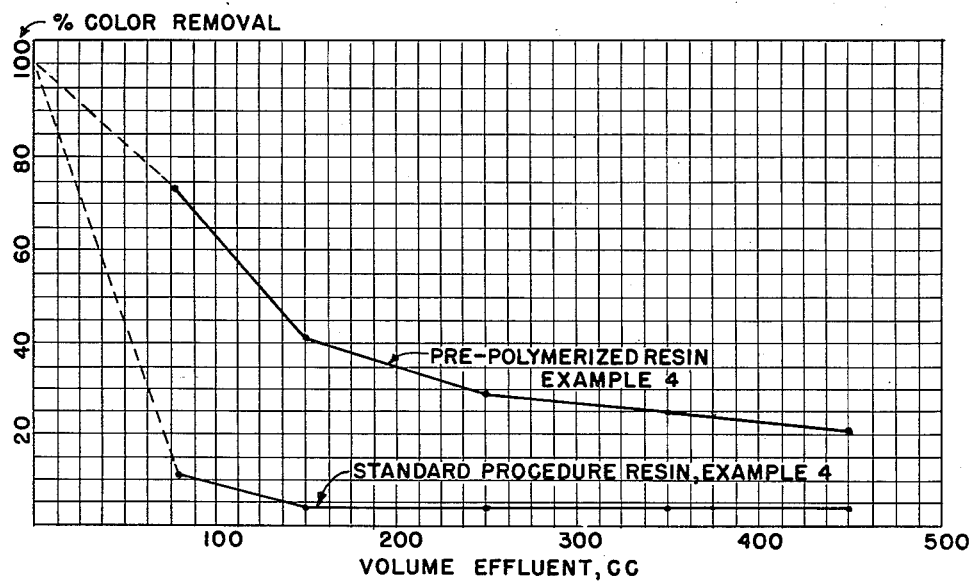
INVENTOR.
IRVING M. ABRAMS
BY
ATTORNEYS

United States Patent Office 3,122,514
Patented Feb. 25, 1964

3,122,514
ION EXCHANGE RESINS AND METHOD OF
PREPARATION THEREOF
Irving M. Abrams, Redwood City, Calif., assignor, by mesne assignments, to Diamond Alkali Company, Cleveland, Ohio, a corporation of Delaware
Filed Sept. 26, 1958, Ser. No. 763,511
13 Claims. (Cl. 260—2.1)

This invention relates to ion exchange resins having functional ion exchange groups attached to conditioned, cross-linked resin matrices of copolymerized monovinyl aromatic monomers and polyvinyl monomers; and more particularly to the preparation of such resins by prepolymerizing the monovinyl monomer in the presence of an inert gas to provide resin matrices for synthetic ion exchange resins having markedly advantageous characteristics. The term "resin matrix" or "resin matrices" as employed herein designates the hard, infusible and water insoluble carrier resin or resins to which the functional exchange groups of ion exchange resins are attached. This application is a continuation-in-part of copending applications Serial No. 383,977, filed October 5, 1953, and Serial No. 519,664, filed July 1, 1955.

Ion exchange resins having functional ion exchange groups attached to cross-linked resin matrix copolymers of monovinyl aromatic monomers and polyvinyl compounds are well known, and the preparation of such ion exchange resins is described in United States Letters Patent Nos. 2,366,007; 2,366,008; 2,591,573; 2,614,099; 2,629,710; 2,632,001 and others. In manufacturing such copolymers from monovinyl aromatic and polyvinyl compounds on a commercial scale to produce ion exchange resin matrices, it has generally been found convenient and economical to mix the monovinyl monomer and polyvinyl monomer together with a suitable catalyst to form a homogeneous phase, and then to disperse such mixture with agitation in an aqueous medium containing a suitable suspending agent. The resulting heterogeneous dispersion is heated until the liquid mixture of monovinyl monomer and polyvinyl monomer has been copolymerized to form hard, insoluble and infusible beads or granules. The cross-linked copolymers thus formed have been employed as resin matrices for many types of cation and anion exchange resins. For example, the aforementioned United States Letters Patent No. 2,366,007 discloses the preparation of a cation exchange resin from such a copolymer by sulfonation of the resin matrix, and the United States Letters Patent No. 2,366,008 deals with the preparation of an anion exchange resin in which the resin matrix is a copolymer of a monovinyl and polyvinyl compound.

Although the resin matrices prepared from monovinyl and polyvinyl monomers in accordance with usual methods of preparation have been extensively employed in the manufacture of ion exchange resins, all of the properties of such resin matrices are not ideal for ion exchange resins. In the first place, resins made in the conventional manner vary greatly in porosity with variation in the amount of polyvinyl compound used in their preparation. When a sufficient amount of polyvinyl compound is employed to provide good physical and chemical characteristics, the resultant ion exchange resin has a low porosity. This in turn results in slow diffusion or non-diffusion of large molecules into and out of the resin matrix. Since color bodies in aqueous solutions are generally large molecules, the color removing ability of conventionally prepared ion exchange resins is limited.

Also, when a resin matrix is prepared in the customary manner, it is difficult to avoid production of a high percentage of relatively small fine resin particles. Such small particles are not suitable for use in upflow ion exchange operations since they are either swept out of the column or cause plugging of a screen designed to prevent escape of the resin particles. They also cause excessive pressure drop in down flow operations. Furthermore, the conventional ion exchange resins prepared from monovinyl aromatic monomers and polyvinyl monomers exhibit greater volume change than is to be desired when they are subjected to solutions of varying ionic strength, and the resultant expansion and contraction cause a strain on the resin structure. In addition, difficulties are encountered in making a sulfonated cation exchange resin in bead form without cracking or breaking of the spherical bead particles both during sulfonation of the resin matrix and during hydration of the sulfonated resin.

In accordance with this invention and as a summary thereof, the foregoing problems are overcome and an ion exchange resin having markedly superior characteristics is produced by mixing a previously polymerized monovinyl aromatic compound, referred to herein as prepolymerized, with a polyvinyl compound to form a liquid mixture, copolymerizing the mixture in the usual manner as disclosed in the aforementioned patents to form a cross-linked resin matrix, and then chemically treating said resin matrix by any of the well known procedures employed for this purpose to introduce functional ion exchange groups or radicals into said resin matrix and form a water insoluble, infusible ion exchange resin.

The monovinyl aromatic compound is prepolymerized to provide the desired viscosity of the final mixture with the polyvinyl compound, as described hereafter in greater detail. Either one of two procedures can be followed. In accordance with one procedure the monovinyl aromatic compound is partially prepolymerized in situ directly to the extent required for producing the desired liquid mixture with the polyvinyl compound. Alternatively, the monovinyl compound can be employed in the form of a solution of the solid or liquid resin which had been polymerized more than desired for the purpose of this invention. A solvent for the solid or viscous monovinyl polymer is added to the polymer to adjust the viscosity and provide the desired final mixture. In the first procedure in which the monovinyl compound is only partially polymerized directly to the extent desired, the prepolymerization is advantageously conducted in an atmosphere of an inert gas.

An ion exchange resin with the desirable characteristics of the resin obtained by the method of this invention can be prepared only by employing a prepolymerized monovinyl compound, and not by prepolymerization of the polyvinyl compound. Polymerization of the polyvinyl compound or of a mixture of the polyvinyl compound and monovinyl compound proceeds too rapidly to be controlled and produces a solid, insoluble polymer. Even if inhibitors are employed, prepolymerization of the polyvinyl monomer with subsequent copolymerization of a mixture of polyvinyl compound and monovinyl monomer can not be utilized to produce the resin matrix of this invention.

The properties of ion exchange resins prepared by employing a prepolymerized monovinyl compound are different in many respects from the properties of resins prepared by conventional means. The resins of this invention are relatively opaque compared to the translucent ion exchange resins of identical constituents prepared without first prepolymerizing the monovinyl compound. It is believed that the relative opaqueness is due to the presence of linear polymer in the structure, part of which washes out during the chemical processing necessary to introduce the ion exchange groups. This leaves a system of micro-channels and pores through which molecules diffuse more readily than in conventional ion exchangers.

Furthermore, the ion exchange resin matrices prepared with prepolymerized monovinyl aromatic compounds are of uniform composition throughout, while the resin matrices composed of cross-linked copolymers of monovinyl and polyvinyl monomers prepared in the conventional manner without use of such prepolymerized monovinyl compounds are surrounded by a hard surface layer. This is evidenced by the slow rate of penetration by sulfuric acid of the outer surface of conventional ion exchange resin matrices in the preparation of sulfonic acid cation exchange resins unless a swelling solvent is used, and the comparatively rapid rate of penetration of the interior of such conventional resin matrices once the reaction has been commenced. On the other hand, sulfonation of the ion exchange resin matrices of this invention occurs at a uniform rate. Also, upon compression of a spherical particle of a conventional ion exchange resin matrix until breakage occurs, the resin acts like a body having a thin rigid skin surrounding it. However, the resin matrix of this invention on compression acts like it has a homogeneous structure. In addition, the slow rate of diffusion at the outer surface of conventional ion exchange resins is probably caused by the presence of an outer shell having a higher degree of cross-linking than the interior of the resin.

The greater porosity of resin matrices in which the monovinyl monomer was prepolymerized before copolymerization enables anion exchange resins prepared therefrom to remove an appreciably greater amount of color, and to have a higher capacity for removal of color than corresponding anion exchange resins prepared by conventional methods. Also, the porous cation exchange resins prepared from such resin matrices remove color from color bearing solutions, whereas conventional cross-linked polystyrene type cation exchange resins do not generally remove appreciable quantities of color because the available surface area is restricted. Furthermore, the ion exchange resins hereof are less subject to organic fouling than ion exchange resins prepared in the usual manner.

Another advantage which results from employing a prepolymerized monovinyl monomer is that in the preparation of the resin in bead form, the bead size may be controlled by adjusting the viscosity of the mixture of prepolymerized monovinyl compound and polyvinyl compound. Relatively large beads are often desirable for use in columnar upflow operations where the loss of small beads through the system would create a problem. Furthermore, when ion exchange resin beads made with the matrix of this invention are subjected to solutions of varying ionic strength, the resulting variations in particle size are somewhat smaller than with conventional beads thereby providing a structure which is subjected to less strain.

Also, the resin matrix prepared by prepolymerizing the monovinyl monomer may be both sulfonated and then directly hydrated without breakage, whereas a high percentage of the resin beads prepared in accordance with standard practice without prepolymerization of the monovinyl monomer crack and break upon sulfonation, and most of the remaining beads break and shatter upon immerison of the sulfonated resin in water. This is of considerable importance in the preparation of satisfactory sulfonated type cation exchange resins. Breakage of beads becomes a particularly serious problem with the larger bead sizes. A substantial proportion of resin matrix beads prepared without prepolymerization which are retained on a 30 mesh screen (U.S. Standard Sieve) break upon sulfonation. However, if the prepolymerization method hereof is employed in preparing the resin matrix, beads that remain on a 16 mesh screen can be sulfonated without breakage.

The accompanying drawing is a graph illustrating the percent color removal of an anion exchange resin prepared from the resin matrix of this invention compared to the percent color removal of an anion exchange resin of the same components and in the same percentages prepared in accordance with the conventional manner, the preparation of such resins being described in Example 4 hereof.

Prepolymerization of the monovinyl compound either with or without conducting the prepolymerization in an atmosphere of inert gas so as to exclude air produces the desirable results heretofore described and results in an ion exchange resin with substantially the same porosity and color removal properties. However, when the monovinyl compound is only partially prepolymerized directly to the extent necessary to provide the desired viscosity of the final mixture with the polyvinyl compound, surprising improvements in the method and resultant ion exchange resin are obtained by conducting the prepolymerization in the absence of oxygen. This can readily be achieved by bubbling an inert gas through the polymerization vessel.

The absence of oxygen during prepolymerization results in a shorter and more reproducible polymerization time. Thus the use of an inert gas in the prepolymerization step is very advantageous for the commercial production of ion exchange resins since it eliminates the necessity of constantly checking the progress of the prepolymerization, and thus insures that a final product of uniform quality can be prepared consistently. The amount of inert gas employed is immaterial as long as it is sufficient to exclude air.

Also, other surprising advantages obtained by the use of an inert atmosphere in prepolymerization of the monovinyl compound include improved physical structure and higher and more consistent ion exchange capacities.

The use of an inert gas in accordance with this invention is advantageous only in the prepolymerization of the monovinyl monomer. No particular advantage is obtained by conducting the final copolymerization of the monovinyl compound and the polyvinyl compound in the presence of an inert gas.

In greater detail, any monovinyl aromatic monomer with an unsubstituted vinyl group polymerizable with a polyvinyl compound and commonly employed in the preparation of the well known resin matrix copolymers of monovinyl compounds and polyvinyl compounds is suitable for use in this invention. The monovinyl compounds which are utilized for preparation of the resin matrix are unsubstituted aromatic monovinyl hydrocarbons, and aromatic monovinyl hydrocarbons in which halogen atoms have been substituted for hydrogen atoms, both herein referred to as monovinyl aromatic or aryl hydrocarbons, or more briefly as monovinyl compounds. Examples of such monovinyl monomers are styrene, vinyl toluene, vinyl xylene, vinyl naphthalene, ethyl vinyl benzene, vinyl chlorobenzene, 2,5-dichlorostyrene, chloromethyl styrene as well as other monovinyl compounds with unsubstituted vinyl groups described in the aforementioned patents. When the vinyl group contains substituents other than hydrogen, particularly an organic radical such as a methyl group, the addition polymerization does not proceed to the extent desired for production of a resin matrix suitable for an ion exchange resin.

The monovinyl aryl monomer must be prepolymerized to a viscosity of at least about 0.1 poise and it must provide a viscosity of the final mixture with the polyvinyl compound above about 0.05 poise in order to obtain an ion exchange resin having the advantageous properties of increased porosity, structural homogeneity, rapid reaction rate, and reduced breakage and strain upon chemical treatment during introduction of ion exchange groups. By defining the polymerization in terms of viscosity, a measure is provided of the extent of prepolymerization as well as of the concentration of polymer in any solvent for such polymer that may be present. The prepolymerized monovinyl compound is provided either by partial polymerization directly to the desired extent, or by use of a more highly polymerized or completely polymerized solid monovinyl compound together with a solvent for the prepolymerized monovinyl compound in order to reduce the viscosity. All viscosity measurements herein up to 148 poises were made at 25° C. by Gardner-Holdt method, and all viscosity measurements above 148 poises were made at 25° C. with a Brookfield viscosimeter.

For the preparation of ion exchange beads the monovinyl compound is prepolymerized to provide a viscosity of between about 0.05 poise and 100 poises in the final mixture with the polyvinyl compound before copolymerization as is discussed in greater detail hereinafter. However, if the resin matrix is not prepared in bead form, there is no upper limit for the extent of prepolymerization of the monovinyl monomer except that the final mixture of prepolymerized monovinyl aryl hydrocarbon and polyvinyl compound must be a liquid in order to effect copolymerization. The intermixing of the polyvinyl monomer with the prepolymerized monovinyl aryl hydrocarbon provides a mixture that has a substantially lower viscosity than that of the prepolymerized monovinyl hydrocarbon alone. Nevertheless, if the monovinyl aryl hydrocarbon has been prepolymerized to such an extent that even its mixture with the polyvinyl compound has an undesirably high viscosity, or if a completely polymerized solid monovinyl aryl compound is employed, the viscosity of the prepolymerized monovinyl compound or of its mixture with the polyvinyl compound can be reduced by adding unpolymerized monomer.

Similarly, other solvents for the prepolymerized monovinyl hydrocarbon can be employed to reduce the viscosity of the prepolymerized compound or of its mixture with the polyvinyl compound to the desired range without adversely affecting the advantageous properties imparted to the final ion exchange resin by prepolymerization. Aromatic solvents, such as benzene, toluene, xylene, monochlorobenzene, orthodichlorobenzene and naphthalene are preferred since they have no adverse action on the final resins. On the other hand, if it is desired to increase the viscosity of a monovinyl compound that has only been prepolymerized to a low viscosity, more completely polymerized monovinyl compound may be added.

Furthermore, as previously explained, the prepolymerized monovinyl monomer may be provided by dissolving a solid polymer of a monovinyl aromatic compound in a monovinyl monomer until the desired viscosity of the final mixture with polyvinyl compound is obtained. This method provides a final ion exchange resin having all of the advantages of the resin obtained by prepolymerizing a monomer directly to the viscosity to be employed. Consequently, commercially available monovinyl aryl hydrocarbons that have been completely polymerized, such as solid molding grade linear polystyrene, may be dissolved in a monovinyl monomer to provide the prepolymerized monovinyl compound employed in accordance with this invention.

When the monovinyl monomer is partially prepolymerized directly to the desired viscosity, the prepolymerization is advantageously carried out by subjecting the monomer to heat in the absence of oxygen. The use of elevated temperatures without a catalyst provides the best means of controlling the degree of prepolymerization. Agitation of the monovinyl monomer while maintaining a temperature of between 80° C. and 120° C. is preferred as the method of carrying out such prepolymerization, but this temperature range is not critical. Catalysts may be used, but they give less controllable polymerizations and lower molecular weight polymers.

If the prepolymerization of the monovinyl monomer is effected by a catalyst, any catalyst commonly used as a polymerization catalyst for such monomers may also be employed. For example, the organic peroxides, such as benzoyl peroxide, lauroyl peroxide, tertiary-butyl hydroperoxide, and methyl ethyl ketone peroxide may be used. Also, "per" compounds such as tertiary-butyl perbenzoate are suitable. In addition, acid type catalysts such as aluminum chloride and sulfuric acid may be employed in the prepolymerization of the monovinyl monomer. When a catalyst is employed to accelerate the prepolymerization, the amount should be small if it is intended to prepolymerize directly to an extent that will provide the desired viscosity in the final mixture with the polyvinyl compound. High catalyst concentrations and high temperatures in the prepolymerization process render the prepolymerization difficult to control; however, if polymerization proceeds beyond the desired viscosity, it can be corrected by addition of more monovinyl aryl monomer or other solvent in the manner previously explained. An amount of catalyst, if employed, between 0.1 to 1.0 percent by weight of the monovinyl monomer is preferred, but a larger amount can be used.

When the partial polymerization is conducted in the absence of oxygen, any inert gas that is unreactive with the monovinyl monomer and which is free of available oxygen may be employed for the prepolymerization. Carbon dioxide and nitrogen are preferred since they are readily available and convenient. Examples of other inert gases that might be employed are helium, argon, methane and ethane. The introduction and use of an inert gas in the prepolymerization step may be accomplished by bubbling the gas into the monovinyl compound contained in a reaction vessel of the usual type in which such reactions are conducted, namely, one having a relatively narrow upper opening compared to the size of the vessel, such as any reflux condenser which will permit entrapped air in the vessel to escape as the inert gas is introduced. In this manner the inert gas sweeps out the air in the reaction vessel. Also, as long as the inert gas is constantly entering the vessel through an inlet conduit and escaping through the opening in the upper part of the vessel, it prevents entry of air. The flow of inert gas into the reaction vessel is preferably commenced before the prepolymerization is started in order to remove air initially present in the reaction vessel, and it is continued until the prepolymerization has been completed. Substantially the same results can be obtained by the use of an evacuated sealed polymerization vessel.

Following prepolymerization to the desired extent, the partially polymerized monovinyl compound is then cooled to a temperature that will stop further polymerization, and thoroughly intermixed with the polyvinyl monomer so that the mixture forms a homogeneous phase. If desired, introduction of the inert gas can be continued during the cooling phase.

Any polyvinyl compound having at least two active vinyl groups polymerizable with the monovinyl aryl hydrocarbon may be used to form a cross-linked insoluble, infusible copolymer when copolymerized with the monovinyl aryl hydrocarbon. Polyvinyl compounds of this type are the same compounds employed to form the usual resin matrices without prepolymerization, and they are well known in the art. Examples of such compounds are divinyl benzene, ethylene glycol dimethacrylate, divinyl toluene, divinyl xylene, divinyl naphthalene, trivinyl benzene, divinyl chlorobenzene, diallyl phthalate, divinyl acetylene and diallyl fumarate as well as the polyvinyl compounds otherwise specified in the aforementioned patents. The usual commercial mixtures containing divinyl benzene are preferred for use in providing the divinyl constituent because of their ready availability and the excellent characteristics of the resultant copolymer resin matrix. Mixtures of vinyl compounds containing from 20 percent to 55 percent of the polyvinyl constituent have been employed in producing satisfactory ion exchange resins in accordance with this invention. Although divinyl aryl hydrocarbons, such as divinyl benzene, are the best known cross-linking agents for monovinyl aryl hydrocarbons, it has now become established that aliphatic polyvinyl compounds and polyvinyl compounds containing other groups such as oxygen are suitable, and such polyvinyl compounds are included in the foregoing examples.

The proportions of the monovinyl aromatic compound and the polyvinyl compound employed in the preparation of the resin matrix of this invention may vary considerably, and the resultant exchange resin produced therefrom may be used for ion exchange purposes regardless of such variations in portions. However, the relative amounts of the monovinyl compound and polyvinyl compound employed govern properties such as hardness and complexity of the resin matrix, which properties in turn affect subsequent reactions of the resin matrix and also the properties of the final ion exchange resin.

Too small an amount of the polyvinyl compound results in a resin matrix that swells considerably and may partially dissolve in subsequent reaction media, and the final ion exchange resin may also swell excessively in the course of ion exchange reactions. Furthermore, use of too small an amount of the polyvinyl compound provides an ion exchange resin of comparatively low density and as a result the exchange resin has a low capacity per unit volume. On the other hand, too great a percentage of the polyvinyl compound provides a dense resin matrix that will react very slowly in the subsequent steps of preparing the ion exchange resin. Also, when a high proportion of the polyvinyl compound is employed, the resultant dense final exchange resin has a low rate of ion exchange and generally a low operating exchange capacity. A suitable range of proportions of the monovinyl aryl monomer is from 60.0 percent to 99.9 percent by weight with the corresponding range of the polyvinyl compound being from 40.0 percent to 0.1 percent. The preferred range is from 85.0 percent to 95.0 percent by weight of the monovinyl monomer compound and 5.0 percent to 15.0 percent of the divinyl compound. Thus, the resultant copolymerized ion exchange resin matrix is formed from a major proportion of the monovinyl compound. Approximately 0.1 percent to 2.0 percent of the catalyst is used in the final polymerization based upon the total weight of the compound to be copolymerized.

As previously described, the monovinyl aryl hydrocarbon must be prepolymerized to a viscosity of at least about 0.1 poise and it must provide a viscosity of the final mixture with the polyvinyl compound of at least about 0.05 poise in order to obtain the advantageous results of this invention. For the preparation of ion exchange beads, best results are obtained when the monovinyl compound and polyvinyl compound mixture before copolymerization has a viscosity below about 30 poises, but a final mixture viscosity up to 100 poises may be employed. When the viscosity of the final mixture immediately prior to suspension polymerization is above about 100 poises, the viscous solution is hard to handle, and the resultant beads tend to get undesirably large and to swell in aqueous solutions. Also any reaction to attach functional ion exchange groups to beads prepared from final mixtures having a viscosity above about 100 poises produces breakage of the beads and also causes the beads to lose their round form. In other words for the preparation of ion exchange beads, the final mixture which is copolymerized, including any solvents or additives, must have a viscosity between about 0.05 poise and 100 poises. However, when ion exchange resins hereof are prepared in other than bead form, there is no upper limit to the viscosity of the final mixture of monovinyl aryl hydrocarbon and polyvinyl compound, except that the mixture must be liquid in order to form the copolymer.

The viscosity of the final mixture is affected by all of the compounds that are present. The polyvinyl monomer itself, when added to the monovinyl compound provides a solution having a lower viscosity than that of the prepolymerized monovinyl compound. Other monomers, such as ethylvinylbenzene, often mixed with commercial polyvinyl compounds also lower the viscosity of the final mixture. In addition, as previously described, solvents for the prepolymerized monovinyl compound, such as the monovinyl monomer and other solvents may be utilized to reduce the viscosity of the final mixture to the range specified.

A conventional polymerization catalyst is preferably intermixed with the mixture of the prepolymerized monovinyl compound and the polyvinyl compound in order to effect the final polymerization at a suitable rate. Although the final polymerization could be carried out by use of heat alone, the process would take an undesirably long time to carry out, and the properties of the resin matrix would not be desirable for ion exchange purposes. Polymerization catalysts that effect rapid polymerization of the mixture of prepolymerized monovinyl compound and polyvinyl monomer are well known in the art. Among the suitable catalysts for use in the practice of this invention are ozone, organic peroxide agents, inorganic peroxides and the "per" salts such as water soluble perborates, persulfates and perchlorates. The organic peroxides produce the best results.

The final copolymerization of the prepolymerized monovinyl aryl compound and the polyvinyl compound may be carried out by any of a variety of well known methods as described in the aforementioned patents. A mixture of prepolymerized monovinyl compound, polyvinyl monomer and catalyst may be polymerized in bulk or such a mixture may be suspended in a liquid medium and then polymerized. The well known technique of suspension polymerization described in Chapter I, pages 1 to 20 of "High Molecular Weight Organic Compounds," by Hohenstein and Mark, is preferred. In this process a mixture of the liquid vinyl compounds and a soluble catalyst such as benzoyl peroxide, are suspended with continuous stirring in an aqueous medium containing a hydrophilic suspending agent such as gelatin, starch, polyvinyl alcohol, or gum arabic. Such suspending agents are well known and are commonly used commercially for making ion exchange beads. Other known suspending agents which applicant has successfully employed for making such beads include methyl cellulose and hydroxyethyl cellulose solutions, as well as colloidal aluminum magnesium silicate. To make ion exchangers having a smaller particle size, surface active agents may be added to lower interfacial tension between the phases.

Application of heat to the suspension converts the compounds successively into viscous droplets, small rubbery particles, and finally into hard-bead-like spheres. Nearly all the spheres of the insoluble vinyl hydrocarbon copolymer pass a 16 mesh screen but are retained on a 60 mesh screen. If desired, larger beads may be prepared by employing a slow rate of stirring, and also by prepolymerization of the monovinyl aryl compound to a highly viscous liquid. When the mixture of prepolymerized monovinyl compound and polyvinyl compound is polymerized in bulk, a resin matrix in bulk form is obtained rather than bead form. The bulk matrix has all of the advantages of the resin of this invention, such as greater porosity, but it does not have the desirable property of being in bead form for convenient ion exchange operations.

The resultant resin matrix is then employed in any of the well known methods of preparing any anion exchange resins or cation exchange resins in which functional ion exchange groups are attached to a resin matrix copolymer of a monovinyl aryl monomer and a polyvinyl monomer. In such methods the resin matrix copolymer is chemically treated to introduce functional ion exchange groups or radicals into the polymer molecule and thus form an ion exchange resin. For example, the amination of such a resin matrix may be achieved by nitration with nitric acid and subsequent reduction as described in United States Letters Patent No. 2,366,008 in order to produce an anion exchange resin. Anion exchange resins may readily be prepared from the prepolymerized ion exchange resin matrix by chloromethylation and amination with an amine such as by the methods described in United States Letters Patent Nos. 2,591,573 and 2,614,099. Also sulfonic acid cation exchange resins are readily produced by sulfonating such resin matrix with a sulfonating agent selected from the group consisting of concentrated sulfuric acid, sulfur trioxide and chlorosulfonic acid. In addition, phosphonous and phosphonic cation functional cation exchange groups may be introduced into the resin matrix, as disclosed in Letters Patent No. 2,844,546. Carboxylic and other functional groups can be introduced to make weak acid cation exchangers. A given resin may contain more than one type of ion exchange group. Anion exchangers may be made which contain sulfonium groups and phosphonium groups.

The following are typical specific examples of the preparation of ion exchange resins in which the monovinyl aryl hydrocarbon is prepolymerized.

EXAMPLE 1

*Prepolymerization.*—400 cc. of commercial styrene was heated in a 500 cc. of Erlenmeyer flask fitted with a cork stopper and thermometer. The temperature was maintained at 80–85° C. for a total of 32 hours after which the viscosity of the liquid was found to be 3.2 poises at 25° C.

*Copolymerization.*—This prepolymerized styrene was allowed to cool to 30° C., and added to 22.5 cc. of a 40% solution of commercial divinyl benzene containing 0.75 gram of benzoyl peroxide to make a total volume of 100 cc. This solution, which had a viscosity of 1.2 poises, was poured into a 3-neck, 500 cc. flask containing 200 cc. of a 1% aqueous solution of gum arabic at a temperature of 85° C. The contents were agitated with a mechanical stirrer so as to result in a suspension of a liquid non-aqueous phase in the aqueous solution. The temperature was maintained at 85° C. by means of a heating mantle and variable transformer until the globules gelled to form hard beads with a density greater than water. The temperature was then raised to 95° C. and held there for 14 hours. The contents of the flask was then cooled, the beads were filtered off, washed with water, and dried at 100–105° C. for 2 hours. The resulting beads were white and opaque.

*Preparation of cation exchange resin.*—Twenty grams of these beads were sulfonated using 100 cc. of 94% sulfuric acid at temperatures from 100–120° C. for 24 hours. To maintain the acid concentration, a total of 40 cc. of 104% sulfuric acid was added during the sulfonation. The excess acid was drained off and the beads were immersed in 1 liter of tap water. After thorough washing, the exchange capacity was determined and found to be 2.1 equivalents per liter. The beads were opaque and light brown in color. Very nearly all the beads were perfect, uncracked spheres.

A parallel procedure was carried out as a control using the same ingredients and proportions as in the foregoing part of this example. The prepolymerization step of the monovinyl monomer was omitted and the polymerization was carried out in the same way as the preceding final polymerization except that the divinyl benzene solution was copolymerized with the styrene monomer instead of the prepolymerized styrene. The unsulfonated beads were clear and glassy. Upon sulfonation in the manner previously described, the reaction was much slower in starting, but once started, it proceeded rapidly, indicating a crust-like structure on the outside of each particle. Cracking and splitting occurred as the reaction proceeded. When the beads were immersed in water a great deal of shattering occurred, resulting in the production of a substantial quantity of "fines." The final washed product consisted of small, irregular particles which were translucent, brown, and clear.

EXAMPLE 2

*Prepolymerization.*—400 cc. of commercial styrene was polymerized by the same procedure as in Example 1 except that 0.5% benzoyl peroxide catalyst was put into the styrene before prepolymerization. The reaction was exothermic and difficult to control with the temperature reaching 93° C. at one point. A viscosity of 4.2 poises (at 25° C.) was reached after only 55 minutes of heating in an oven kept at 84° C.

*Copolymerization.*—In making up the copolymerization mix, the prepolymerized styrene was added to 35.7 cc. of a commercial solution containing 28% divinylbenzene to a total volume of 100 cc. The resultant mixture had a viscosity of 0.8 poise. No further catalyst was added. The polymerization to the bead form of the resin matrix was completed in the manner described in Example 1.

*Preparation of cation exchange resin.*—Twenty grams of the beads of resin matrix were sulfonated and hydrated in the manner described in Example 1 for preparation of a cation exchange resin. The resulting beads were light brown and opaque as before. There was very little splitting or breaking during sulfonation and hydration. The beads were somewhat softer than the cation exchange resin of Example 1 prepared without use of a catalyst in the prepolymerization. The exchange capacity was 1.8 equivalents per liter.

EXAMPLE 3

*Prepolymerization.*—150 cc. of styrene was prepolymerized by heating in a 250 cc. Erlenmeyer flask of 90–95° C. for about 8 hours. The resulting viscosity was 2.5 poises at 25° C.

*Copolymerization.*—The prepolymerized styrene was mixed with 17.5 cc. of a 40% commercial divinyl benzene solution containing 0.75 gm. of dissolved benzoyl peroxide to make a total volume of 100 cc. The resultant mixture had a viscosity of 1.2 poises. The suspension polymerization was carried out in the manner described in Example 1.

*Preparation of anion exchange resin.*—Fifty grams of the dried beads of resin matrix was immersed in 200 cc. of methyl chloromethyl ether (boiling range 58–61° C.). The beads were allowed to swell at room temperature with agitation for two hours. Thirty grams of powdered anhydrous zinc chloride was added, and the temperature maintained between 20 and 25° C. for 6 hours. The product was washed first with isopropanol, then with water and finally dried overnight in an oven at 60° C. Twenty grams of the dried, chloromethylated beads were swelled in 100 cc. benzene and refluxed for one hour after which 50 cc. of dimethyl ethanolamine was added and the reaction was allowed to proceed at 70° C. for 3 hours. The resulting product was washed with benzene, then with methanol, and finally with water. The final beads were spherical, opaque and had a yellowish tinge. The salt-splitting capacity of this resin was found to be 0.90 equivalent per liter.

To test the comparative adsorptive properties of this resin, a colored commercial sugar solution obtained from a beet sugar factory was run through a column of resin prepared as described above in parallel with the same volume of a control resin prepared in a similar manner using styrene monomer which was not prepolymerized. In both cases the resins were in the hydroxyl form, having been regenerated with an excess of sodium hydroxide. The colored sugar solution was passed first through a conventional cation exchanger and then divided into two portions. One portion was passed through a bed of anion exchanger prepared by the prepolymerization procedure of this example, and the other through the same volume of a bed of the control resin, both to pH breakthrough. Color removal in the prepolymerized sample was about 50% whereas in the control sample it was only 10%; the measurements benig made as in Example 4.

Furthermore, it was observed that the adsorbed color was more thoroughly removed from the prepolymerized resin on regeneration with alkali.

EXAMPLE 4

*Prepolymerization.*—150 cc. of a commercial grade vinyl toluene (about 70% meta-methyl styrene and 30% orthomethyl styrene) was heated in a 250 cc. Erlenmeyer flask fitted with a cork stopper and thermometer. The liquid was kept at 100° C. for 7 hours, then cooled to room temperature. The viscosity was found to be 3.2 poises at 25° C.

*Copolymerization.*—A copolymerization mix was then made up using 87 cc. of this prepolymerized vinyl toluene, 13.0 cc. of a commercial solution of divinyl benzene containing 53.9% divinyl benzene and 0.545 gram of benzoyl peroxide. The mix had a viscosity of 1.9 poises. A suspension polymerization was carried out in which this solution was suspended in 250 cc. of an aqueous solution containing 0.5% polyvinyl alcohol. The temperature was held at 85–88° C. for 5 hours, then raised and held at 90° C. for 20 hours. The resulting beads were cooled, washed with water, and dried in a hot air oven at 95° C. for 5 hours.

*Preparation of anion exchange resin.*—Twenty grams of dried beads were swelled in 250 cc. of benzene in a 3-neck 500 cc. balloon flask at 60° C. for one hour with agitation. With the beads fully swollen, 13 cc. of phosphorus trichloride was added and gaseous chlorine was bubbled into the reaction flask at the rate of 3 to 4 bubbles per second. The temperature was maintained at 68–70° C. for 20 hours, after which the contents of the flask was cooled, the beads were washed thoroughly with benzene, then methanol, then benzene again.

Without drying, the resin was immersed in 150 cc. of benzene in a 500 cc. balloon flask fitted with a mechanical stirrer, thermometer and stopper. Fifty cc. of dimethylethanolamine was added and the temperature was raised to 70° C. and maintained for 3 hours. The resultant animated beads were washed thoroughly with methanol, then water. The resin was placed in a 1 inch glass tube and cycled twice with 3 N HCl and 2 N NaOH. The salt-splitting capacity was found to be 0.63 equivalent per liter. The resulting product was opaque and a light cream color when in the salt form, and brown in the hydroxide-regenerated form.

*Preparation of anion exchanger by standard procedure.*—The ingredients, proportions and procedure of copolymerization, chlorination and amination was exactly the same as in the preceding portion of this example, except that the methyl styrene monomer was used instead of the prepolymerized syrup. The salt-splitting capacity of this resin was found to be 0.68 equivalent per liter. The final product had a translucent appearance and was yellow in the salt form and a dark orange in the hydroxide-regenerated form.

The adsorptive properties of the anion exchange resins prepared in this example by the prepolymerization technique of this invention were compared with a similar anion exchange resin prepared by standard procedure by the following procedure. A solution of "Hydrol," the highly colored molasses of the corn sugar industry, was diluted ten-fold, clarified by filtration with diatomaceous earth, then passed through a column of conventional cation exchanger in the acid form. The "Hydrol" solution was then finally divided, and the respective divided portions were passed through columns containing equal volumes of the two anion exchangers of this example, in the hydroxide-regenerated form. Each column of anion exchanger was 60 cc. in volume and 10 cm. high. The rate of flow in these columns was 10 bed volumes per hour. The results were followed by periodic readings of the effluent with a Klett-Summerson colorimeter. The graph illustrates the different behavior of the two resins. The percentage color removal was obtained by the following formula:

$$\text{Percent C.R.} = \left(1 - \frac{C_E}{C_I}\right)100$$

where $C_E$ is the colorimeter reading of the effluent and $C_I$ is the reading of the influent.

On completion of the color removal test, the resins were again regenerated with an excess of 2 N sodium hydroxide whereby the adsorbed color was readily removed and the original colors of the resins were restored.

EXAMPLE 5

*Prepolymerization.*—400 cc. of commercial styrene monomer, inhibited with 10 p.p.m. tertiary butyl catechol, was heated in an Erlenmeyer flask in a circulating hot air oven at 100–110° C. for 3 hours. At the end of this period, the flask was cooled and the viscosity measured. It was found to be 0.5 poise at 25° C.

*Copolymerization.*—This prepolymerized styrene was added to 22.5 cc. of a commercial mixture of divinyl benzene containing 40% of the cross-linking agent and 0.679 gram of benzoyl peroxide to make a total volume of 100 cc. The mixture formed a solution which had a viscosity of 0.28 poise. This solution was thoroughly mixed and the suspension carried out by pouring the solution into 250 cc. of an 0.6% aqueous solution of polyvinyl alcohol in a 500 cc., 3 neck, round bottom flask fitted with a thermometer, stirrer and stopper. The temperature was maintained by a heating mantle at 85° C. for 2 hours with constant stirring until the globules gelled. The resin beads were then hardened by maintaining the suspended beads at 95° C. for 16 hours. The flask was then cooled, and the resin matrix particles were removed, washed and dried.

*Preparation of cation exchange resin.*—To 20 grams of these beads in a 400 cc. beaker there was added 90 cc. of 94% $H_2SO_4$. The temperature was maintained at 90–110° C. for 10 hours during which time the mixture was vigorously agitated and periodic additions of 104% sulfuric acid were made to maintain the concentration of $H_2SO_4$ above 90%. Microscopic examination of samples of the beads during sulfonation revealed slight chipping of the particles. At the end of the sulfonation period the mixture was cooled and poured into a large excess of cold water. The beads were washed free of excess acid, then neutralized with sodium hydroxide. The resulting resin was spherical, opaque and brown in color. The salt-splitting capacity of the acid form of this resin was found to be 1.88 equivalents per liter.

EXAMPLE 6

*Prepolymerization.*—Five grams of benzoyl peroxide was dissolved in 500 cc. of commercial styrene, which contained 10 p.p.m. tertiary butyl catechol as an inhibitor, in a 1 liter Erlenmeyer flask fitted with a cork stopper and thermometer. The contents were heated in an oven set at 82° C. The temperature of the styrene was watched very carefully and when the polymerization reaction became exothermic, the flask was cooled by running tap water to keep the reaction under control. However, the flask was kept mostly in the oven for 69 minutes during which time the temperature varied from 23° C. to a maximum of 93° C. It was then finally cooled, and the viscosity was found to be 26 poises at 25° C.

*Copolymerization.*—136 cc. of this relatively viscous prepolymerized monomer was added to 64 cc. of a commercial solution of divinyl benzene containing 28% of the divinyl benzene. This mixture had a viscosity of 5.0 poises, and it was polymerized in suspension in 400 cc. of an aqueous solution containing 1.0% by weight of polyvinyl alcohol. Because of the high viscosity of the monomer mix the globules were quite large. The temperature was maintained at 83–87° C. for 3 hours, during which time the resin particles gelled. The temperature was raised to 93° C. and maintained at 93–95° C. for 17 hours. The beads were cooled, washed, and dried. About 30% of these beads were larger than 16 mesh (U.S. Standard Sieve).

*Preparation of cation exchange resin.*—The resultant resin matrix beads were sulfonated as in Example 1. The resulting product was spherical, opaque, and grayish-brown. The beads, though large, were nearly all perfect spheres. The salt-splitting capacity of the resin was 1.93 equivalents per liter.

EXAMPLE 7

*Prepolymerization.*—200 cc. of commercial styrene containing 8 p.p.m. of tertiary butyl catechol was heated for 18 hours in an oven set at 80° C. The temperature was then raised to 95° C. and the styrene allowed to further polymerize at this temperature for 2 hours. On removal from the oven the liquid was found to have a viscosity of 9.2 poises.

*Copolymerization.*—This liquid was added to 22.5 cc. of a 40% mixture of commercial divinyl benzene containing 0.57 gram of benzoyl peroxide catalyst to make up a total volume of 100 cc. This mixture had a viscosity of 3.0 poises, and it was stirred thoroughly and poured into three 40 cc. test tubes which were then immersed in a constant temperature bath held at 63° C. The viscous solution gelled overnight after which the polymerization was continued by heating the tubes in a 95° C. oven for 24 hours. The resulting hard, tough copolymer in the form of an elongated mass was removed from the tubes and mechanically ground so that all of the particles passed a No. 16 (U.S. Standard Sieve) screen but were retained on a No. 50 screen.

*Preparation of cation exchange resin.*—A 20 gram sample of the resin matrix was sulfonated by adding 85 cc. at 94% $H_2SO_4$. This mixture was agitated and heated at 100° C. Periodic additions of 104% sulfuric acid were made to maintain the acid concentration, a total of 45 cc. being added in this case. The mixture was cooled after six hours of sulfonation, the acid drained off and the resin particles immersed in about 1 liter of tap water. The granules remained intact during this immersion and in subsequent washing with water. The particles were tan in color and opaque, and, except for their shape, looked very much like the spherical particles described in previous examples. The capacity of this resin was 1.78 equivalents per liter.

Instead of grinding the elongated mass prepared by copolymerization the mass can be chemically treated directly to introduce functional ion exchange groups or radicals into the copolymer molecule and thus convert the elongated mass into an ion exchange resin. The chemical treatment can be with concentrated sulfuric acid to provide an anion exchange resin, or by any of the other well known methods of converting cross-linked polymers of monovinyl aromatic hydrocarbons into ion exchange resins.

EXAMPLE 8

*Prepolymerization.*—A 500 cc. three-neck round bottom flask fitted with a stirrer, thermometer and gas inlet tube was employed in this example. The inlet tube was connected to a cylinder of carbon dioxide gas under pressure. The flask was heated and swept out with carbon dioxide gas after which 300 cc. of monomeric styrene was added. The temperature was maintained by a heating mantle at 100° C. for a total of 4 hours and 10 minutes after which the viscosity of the liquid was found to be 2.8 poises at 25° C. Carbon dioxide gas was continuously introduced into the reaction flask to exclude outside air until the prepolymerization was complete; and then the introduction of the inert gas was discontinued. (Gardner-Holdt method at 25° C. is used in this and all viscosity measurements for the examples.)

*Copolymerization.*—This prepolymerized styrene was allowed to cool to 30° C., and to 75 cc. of the cooled prepolymerized styrene was added 25 cc. of a 40% solution of commercial divinyl benzene containing 0.70 gram of benzoyl peroxide to make a total volume of about 100 cc. The commercial polyvinyl mixture contained 40% divinyl benzene, 50% ethylvinyl benzene and 10% diethyl benzene. The solution of prepolymerized monovinyl compound divinyl benzene and catalyst had a viscosity of 1.8 poises, and it was poured into a three-neck, 500 cc. flask containing 200 cc. of a 1% aqueous solution of soluble starch as a suspending agent at a temperature of 85° C. The contents were agitated with a mechanical stirrer so as to result in a suspension of a liquid non-aqueous phase in the aqueous solution. The temperature was maintained at 85° C. by means of a heating mantle and variable transformer for about two hours until the globules gelled to form hard beads with a density greater than water. The temperature was then raised to 95° C. and held there for 12 hours. The contents of the flask was then cooled, the beads were filtered off, washed with water, and dried in a circulating air oven at 90° C. for 1 hour. The resulting beads were white and relatively opaque.

*Preparation of cation exchange resin.*—Twenty grams of these beads were sulfonated using 100 cc. of 94.5% sulfuric acid at a temperature of 100° C. for 6 hours. To maintain the acid concentration, a total of 30 cc. of 104% sulfuric acid was added during the sulfonation. The excess acid was drained off and the beads were immersed in 1 liter of tap water. After thorough washing, the exchange capacity was determined and found to be 2.2 equivalents per liter. The beads were relatively opaque and light brown in color. Practically all of the beads were perfect, uncracked spheres.

As a control, a cation exchange resin was prepared in the same manner and with the same ingredients and proportions as specified in the beginning of the example except that the prepolymerization was conducted without use of an inert gas. A period of 17 hours was required for prepolymerization of the styrene to a viscosity of about 2.8 poises at 25° C. The capacity of the final cation exchange resin was 1.8 equivalents per liter.

EXAMPLE 9

*Prepolymerization.*—100 cc. of commercial styrene was polymerized by placing the styrene mixed with 0.28 gram of benzoyl peroxide catalyst in a 500 cc. three-neck round bottom flask fitted with a stirrer, thermometer and gas inlet tube. Carbon dioxide gas was bubbled into the styrene in the same manner as in Example 8, and the flask was heated by a heating mantle set for 80° C. The reaction was exothermic and difficult to control and the temperature reached 87° C. at one point even when the heating mantle was removed and the flask containing the styrene was immersed in cool tap water. A viscosity of 7.0 poises (at 25° C.) was reached after 2 hours, at which time the introduction of the inert gas was discontinued.

*Copolymerization.*—In making up the copolymerization mix, 74.3 cc. of the prepolymerized styrene was added to 25.7 cc. of a commercial solution containing 35% divinyl-benzene to provide a total volume of 100 cc. The mix had a viscosity of 4.2 poises. An additional 0.5 gram benzoyl peroxide was added as a catalyst for the copolymerization. The polymerization to the bead form of the resin matrix was completed in the manner described in Example 8.

*Preparation of cation exchange resin.*—Twenty grams of the beads of resin matrix were sulfonated and hydrated in the manner described in Example 8 for preparation of a cation exchange resin. The resulting beads were light brown and relatively opaque as before. There was very little splitting or breaking during sulfonation and hydration. The beads were somewhat softer than the cation exchange resin of Example 8 prepared without use of a catalyst in the prepolymerization. The exchange capacity was 1.7 equivalents per liter.

EXAMPLE 10

*Prepolymerization.*—100 cc. of monomeric styrene was prepolymerized by heating in a 500 cc. three-neck round bottom flask at about 105° C. for 3 hours and 15 minutes with nitrogen gas being continually introduced through the gas inlet tube during prepolymerization as in Example 8. The resulting viscosity was 2.4 poises at 25° C.

*Copolymerization.*—85 cc. of the prepolymerized styrene was mixed with 15 cc. of a 40% commercial divinylbenzene solution containing 0.6 gram of dissolved benzoyl peroxide to make a solution having a total volume of about 100 cc. This solution had a viscosity of 1.6 poises. The suspension polymerization was carried out in the manner described in Example 8.

*Preparation of anion exchange resin.*—Twenty grams of the dried beads of resin matrix was immersed in 100 cc. of methyl chloromethyl ether (boiling range 58–61° C.). The beads were allowed to swell at room temperature with agitation for 2 hours. 34 grams of powdered anhydrous zinc chloride was added, and the temperature maintained between 20° C. and 30° C. for 3 hours. The product was washed first with isopropanol, then with water and finally dried overnight in an oven at 80° C. 20 grams of the dried, chloromethylated beads were swelled in 80 cc. benzene, after which 80 cc. dimethyl ethanolamine was added and the reaction mixture was allowed to reflux for 3 hours. The resulting product was washed with benzene, then with methanol, and finally with water. The final beads were spherical, relatively opaque and had a yellowish tinge. The salt-splitting capacity of this resin was found to be 0.90 equivalent per liter.

To test the comparative adsorptive properties of this resin, a colored commerical sugar solution obtained from a beet sugar factory was run through a column of resin prepared as described above in parallel with the same volume of a control resin prepared in a similar manner, using styrene monomer which was not prepolymerized. In both cases the resins were in the hydroxyl form, having been regenerated with an excess of sodium hydroxide. The colored sugar solution was passed first through a conventional cation exchanger and then divided into two portions. One portion was passed through a bed of anion exchanger prepared by the prepolymerization procedure of this example, and the other through the same volume of a bed of the control resin, both to pH breakthrough. Color removal in the prepolymerized sample was about 50% whereas in the control sample it was only about 10%, the measurements being made by passing a divided flow of filtered and diluted colored molasses solution through columns of the respective ion exchange resins 60 cc. in volume and 10 centimeters high at the rate of 10 bed volumes per hour. The color removal was followed by periodic readings of the effluent with a Klett-Summerson colorimeter. Furthermore, it was observed that the adsorbed color was more thoroughly removed from the prepolymerized resin when the prepolymerized resin and the control standard resin were regenerated with alkali.

EXAMPLE 11

*Prepolymerization.*—Solid commercial linear polystyrene (molding grade) was dissolved in liquid styrene monomer to form a solution having a viscosity of 5.5 poises. This solution provided the prepolymerized monovinyl aromatic hydrocarbon used for preparation of the resin matrix.

*Copolymerization.*—Fifteen grams of ethylene glycol dimethacrylate was added to 85 grams of the prepolymerized solution of monovinyl compound to provide a mixture having a viscosity of 3.8 poises. This mixture was copolymerized by suspension polymerization by adding it to 200 ml. of water containing 0.6% hydroxyethyl cellulose, the initial temperature being 85° C. After three hours at 85° C., the temperature was raised to 91° C. and held there for a period of ten hours. The mixture was stirred continuously during the copolymerization. At the end of the polymerization, the beads were separated from the aqueous medium, washed with water and finally dried in the oven at 110° C. for two hours.

*Preparation of cation exchange resin.*—To 20 grams of the dried beads, 25 ml. of methylene chloride was added followed by the addition of 50 ml. of chlorosulfonic acid. The beads were allowed to react for a period of two hours during which time an exothermic reaction went to a peak and then subsided. Next, the beads were separated from the liquid by filtration, and allowed to remain in a moist atmosphere for 24 hours. Finally, the beads were immersed in water, washed thoroughly until free of excess acid and neutralized with an excess of sodium hydroxide. This converted the sulfonic acid exchanger to the sodium form. After excess alkali was washed out, the cation exchange beads were ready for the softening of water. The resin had an exchange capacity of about 5 meq./gm. or 2.2 eq./l.

EXAMPLE 12

*Prepolymerization.*—As an example of the effect of viscosity of the final mix on the process of this invention, four samples of varying viscosity were polymerized to provide ion exchange resin beads. First, prepolymerized solutions of solid polystyrene in liquid styrene monomer were prepared to have viscosities of 47, 190, 305 and 800 poises.

*Copolymerization.*—Divinylbenzene in the form of a commercial product containing 50.7 percent divinylbenzene, 47.6 percent ethylvinylbenzene and 1.7 percent diethylbenzene was added to each of the prepolymerized solutions until the final mixtures all contained 10.0 percent by weight divinylbenzene. The resultant mixtures had viscosities respectively of 36, 98, 140 and 332 poises.

Copolymer resin matrix beads were then formed by dispersing each of the mixtures separately in an aqueous medium containing a suspension stabilizer consisting of an 0.5 percent solution of gelatin in water. The catalyst was benzoyl peroxide at a concentration of 0.8 percent by weight. Copolymerization was conducted in each case in a three-neck flask fitted with an agitator, a thermometer and a reflux condenser. In the case of the 332 poise mixture, the copolymerization temperature was 90° C. and the total polymerization time was 12 hours. Copolymerization of the other three mixtures was conducted at a temperature of 88° C. for three hours and then at 90° C. for nine hours.

In order to produce beads the agitator stirred the mixture vigorously during the copolymerization. It was necessary to employ a ratio of water to non-aqueous liquid of 5 to 1 in order to produce satisfactory beads from the 332 poise solution. This high ratio is undesirable from a commercial viewpoint inasmuch as the yield per batch in a given equipment size is necessarily reduced. In the case of the 140 poise final mixture, the water to non-aqueous liquid of 3 to 1 was required, and the 36 and 98 poise mixtures required a ratio of 2.5 to 1.

It was very difficult to make beads of a desirably small particle size with the 332 and 140 poise mixtures. Also these viscous mixtures were difficult to handle and transfer. The solid hard beads were separated from the water phase by filtration, washed with water and finally dried in an oven at 90° C. for one hour.

*Preparation of cation exchange resins.*—Twenty grams of each sample was sulfonated using 80 ml. of 94 percent sulfuric acid. Sulfonation was completed in eight hours at temperatures ranging from 95 to 110° C. The excess acid was drained off in each case and carefully displaced with cold water. The beads were then washed with demineralized water. A substantial amount of swelling and breakage occurred with the beads prepared from the mixtures having final viscosities of 332 and 140 poises. The 98 poise final mixture provided acceptably small amount of swelling and breakage, and best results were obtained with beads prepared from the 36 poise final mixture. Even less breakage and swelling are obtained by employing final mixtures having lower viscosities within the range specified herein.

I claim:

1. In the method of preparing a substantially solid, infusible, water insoluble, porous ion exchange resin in which the resin matrix is composed of (a) about 60% to 99.9% by weight of a monovinyl aryl hydrocarbon copolymerized with (b) between about 40% and 0.1% by weight of a polyvinyl compound having at least two active vinyl groups polymerizable with said monovinyl aryl hydrocarbon, the steps of intermixing (a) in a prepolymerized state having a viscosity of greater than about 0.1 poise with (b) in the monomer state to provide a liquid mixture having a viscosity of at least about 0.05 poise, reacting said mixture of prepolymerized (a) and said monomer (b) under heat to form a solid resin matrix copolymer, and thereafter chemically treating said resin matrix copolymer with a chemical agent providing functional ion exchange groups to introduce said functional ion exchange groups into the copolymer molecule and thus form an ion exchange resin, said viscosities being measured at 25° C. by the Gardner-Holdt method.

2. In the method of preparing substantially solid, infusible, water insoluble, porous ion exchange resin beads in which the resin matrix of said ion exchange resin is composed of (a) about 60% to 99.9% by weight of a monovinyl aryl hydrocarbon copolymerized with (b) between about 40% and 0.1% by weight of a polyvinyl compound having at least two active vinyl groups polymerizable with said monovinyl aryl hydrocarbon, the steps of intermixing (a) in a prepolymerized state having a viscosity of greater than about 0.1 poise with (b) in the monomer state to provide a liquid mixture having a viscosity of between about 0.05 poise and 100 poises, reacting said mixture of prepolymerized (a) and said monomer (b) in an aqueous medium under heat and agitation to form a copolymer and to disperse the resultant copolymer in the form of beads and continuing such reaction until substantially all of the copolymer is in the form of solid beads, and thereafter chemically treating said resin matrix copolymer beads with a chemical agent providing functional ion exchange groups to introduce said functional ion exchange groups into the copolymer molecule and thus form ion exchange resin beads, said viscosities being measured at 25° C. by the Gardner-Holdt method.

3. The method of claim 2 in which the prepolymerized monovinyl aryl hydrocarbon is a solid polymer of said monovinyl aryl hydrocarbon, and a solvent for said solid polymer is incorporated in said mixture of (a) and (b) to provide a viscosity of said mixture between about 0.05 poise and 100 poises.

4. The method of claim 2 in which the prepolymerized monovinyl aryl hydrocarbon is a solid polymer of said monovinyl aryl hydrocarbon dissolved in liquid monomeric monovinyl aryl hydrocarbon.

5. The method of claim 2 in which the prepolymerized monovinyl aryl hydrocarbon is prepolymerized by heat directly to produce a mixture of (a) and (b) having a viscosity between about 0.05 poise and 100 poises.

6. The method of claim 2 in which the monovinyl aryl hydrocarbon has substituted chlorine atoms.

7. The method of claim 2 in which the monovinyl aryl hydrocarbon is styrene.

8. The method of claim 2 in which the polyvinyl compound is divinyl benzene.

9. The method of claim 2 in which said resin matrix copolymer beads are chemically treated with a sulfonating agent selected from the group consisting of concentrated sulfuric acid, sulfur trioxide and chlorosulfonic acid to introduce sulfonic acid functional cation exchange groups into the copolymer molecule.

10. The method of claim 2 in which said resin matrix copolymer beads contain haloalkyl groups and are chemically treated with an amine to form anion exchange resin beads.

11. Ion exchange resin beads prepared by the method of claim 2.

12. In the method of preparing substantially solid, infusible, water insoluble, porous ion exchange resin beads in which the resin matrix of said ion exchange resin is composed of (a) about 60% to 99.9% by weight of styrene copolymerized with (b) between about 40% and 0.1% by weight of divinyl benzene, the steps of intermixing (a) in a prepolymerized state having a viscosity of greater than about 0.1 poise with (b) in the monomer state to provide a liquid mixture having a viscosity of between about 0.05 poise and 100 poises, reacting said mixture of prepolymerized (a) and said monomer (b) in an aqueous medium under heat and agitation to form a copolymer of (a) and (b) and to disperse the resultant copolymer in the form of beads and continuing such copolymerization until substantially all of the copolymer is in the form of solid beads, and thereafter reacting said resin matrix copolymer beads by chemical treatment with a sulfonating agent to introduce sulfonic acid functional cation exchange groups into the copolymer molecule and thus form ion exchange resin beads, said viscosity being measured at 25° C. by the Gardner-Holdt method.

13. The method of preparing a substantially solid, infusible, water insoluble, relatively porous ion exchange resin from a resin matrix which is the reaction product consisting essentially of (a) about 60% to 99.9% by weight of a monovinyl hydrocarbon and (b) between about 40% and 0.1% by weight of a polyvinyl compound having at least two active vinyl groups polymerizable with said monovinyl aryl hydrocarbon; comprising rendering said resin matrix relatively porous and substantially uniform throughout, and also substantially reducing the inherent brittleness of such resin matrix which otherwise commonly occurs by the reaction of (a) and (b), by the steps of intermixing (a) in a prepolymerized state having a viscosity of greater than about 0.1 poise with (b) in the monomer state to provide a liquid mixture having a viscosity of between about 0.05 poise and 100 poises, reacting said mixture of prepolymerized (a) and said monomer (b) in an aqueous medium under heat and agitation to form a copolymer of (a) and (b) and continuing such reaction to disperse the resultant copolymer in the form of solid resin particles; and thereafter converting said resin matrix particles to an ion exchange resin by chemical treatment with a chemical agent providing functional ion exchange groups introduced into the copolymer molecule; said viscosities being measured at 25° C. by the Gardner-Holdt method.

References Cited in the file of this patent

UNITED STATES PATENTS

| 2,330,527 | Staudinger | Sept. 28, 1943 |
| 2,366,008 | D'Alelio | Dec. 26, 1944 |
| 2,539,377 | Staudinger | Jan. 23, 1951 |
| 2,623,013 | D'Alelio | Dec. 23, 1952 |
| 2,697,080 | D'Alelio | Dec. 14, 1954 |
| 2,891,014 | Tsunoda et al. | June 16, 1959 |

FOREIGN PATENTS

| 797,191 | Great Britain | June 25, 1958 |